(12) United States Patent
Relkin et al.

(10) Patent No.: US 10,902,068 B2
(45) Date of Patent: *Jan. 26, 2021

(54) SYSTEMS AND METHODS FOR AUTOMATING THE RETRIEVAL OF PARTITIONABLE SEARCH RESULTS FROM A SEARCH ENGINE

(71) Applicant: MapScallion LLC, Harrington Park, NJ (US)

(72) Inventors: Paul W. Relkin, Harrington Park, NJ (US); Norman R. Relkin, Harrington Park, NJ (US)

(73) Assignee: MapScallion LLC, Harrington Park, NJ (US)

( * ) Notice: Subject to any disclaimer, the term of this patent is extended or adjusted under 35 U.S.C. 154(b) by 237 days.

This patent is subject to a terminal disclaimer.

(21) Appl. No.: 16/165,670

(22) Filed: Oct. 19, 2018

(65) Prior Publication Data
US 2019/0057153 A1    Feb. 21, 2019

Related U.S. Application Data

(63) Continuation of application No. 14/815,991, filed on Aug. 1, 2015, now Pat. No. 10,120,938.

(51) Int. Cl.
*G06F 16/951* (2019.01)
*G06F 16/248* (2019.01)
(Continued)

(52) U.S. Cl.
CPC .......... *G06F 16/951* (2019.01); *G06F 16/248* (2019.01); *G06F 16/2455* (2019.01);
(Continued)

(58) Field of Classification Search
CPC ...... G06F 16/951; G06F 16/29; G06F 16/248; G06F 16/2455; G06F 16/9537; G06F 16/24534

See application file for complete search history.

(56) References Cited

U.S. PATENT DOCUMENTS

| 7,664,739 B2* | 2/2010 | Farago ............... G06F 16/9577 707/722 |
| 2005/0131893 A1* | 6/2005 | Von Glan ......... G06F 16/24532 |

(Continued)

OTHER PUBLICATIONS

Christudas, "Query by Slice, Parallel Execute, and Join: A Thread Pool Pattern in Java", Java.net Article, Published Jan. 31, 2008, retrieved from https://web.archive.Org/web/20080207124322/https://today.java.net/pub/a/today/2008/01/31/query-by-slice-parallel-execute-join-thread-pool-pattern.html (Year: 2008).*

*Primary Examiner* — David T. Brooks
(74) *Attorney, Agent, or Firm* — Bryan Cave Leighton Paisner LLP

(57) ABSTRACT

Systems and methods for automating the retrieval of partitionable search results from a database and reducing the latency of delivering the partitionable search results are disclosed. A query for searching a database is constructed. Multiple processing tasks are assigned and executed to retrieve partitioned search results from a database in parallel. Each partition of search results is returned to the user as response messages. Response messages may be continuously received until all search results responsive to the query have been retrieved from the database. When multiple processing tasks are used to retrieve and deliver partitioned search results in parallel, server, internet and client resources are optimized, and the throughput of search results and metadata are increased, and the process of narrowing or filtering search results is an interactive and informed process for the user.

14 Claims, 13 Drawing Sheets

(51) Int. Cl.
    *G06F 16/2455*    (2019.01)
    *G06F 16/9537*    (2019.01)
    *G06F 16/2453*    (2019.01)
    *G06F 16/29*      (2019.01)

(52) U.S. Cl.
    CPC ........ *G06F 16/24534* (2019.01); *G06F 16/29* (2019.01); *G06F 16/9537* (2019.01)

(56) References Cited

U.S. PATENT DOCUMENTS

| | | | | |
|---|---|---|---|---|
| 2005/0240559 | A1* | 10/2005 | Ng | G06Q 10/10 |
| 2007/0055555 | A1* | 3/2007 | Baggett | G06Q 10/02 |
| | | | | 705/5 |
| 2008/0114731 | A1* | 5/2008 | Kumar | G06F 16/954 |
| 2009/0119255 | A1* | 5/2009 | Frank | G06F 40/137 |
| 2009/0157621 | A1* | 6/2009 | Ujiie | G06F 16/24539 |
| 2010/0268723 | A1* | 10/2010 | Buck | G06F 16/24534 |
| | | | | 707/759 |
| 2013/0325840 | A1* | 12/2013 | Kritt | G06F 16/9535 |
| | | | | 707/709 |
| 2014/0149391 | A1* | 5/2014 | Walter | H04W 52/027 |
| | | | | 707/722 |
| 2015/0066907 | A1* | 3/2015 | Somaiya | G06F 16/9535 |
| | | | | 707/722 |

\* cited by examiner

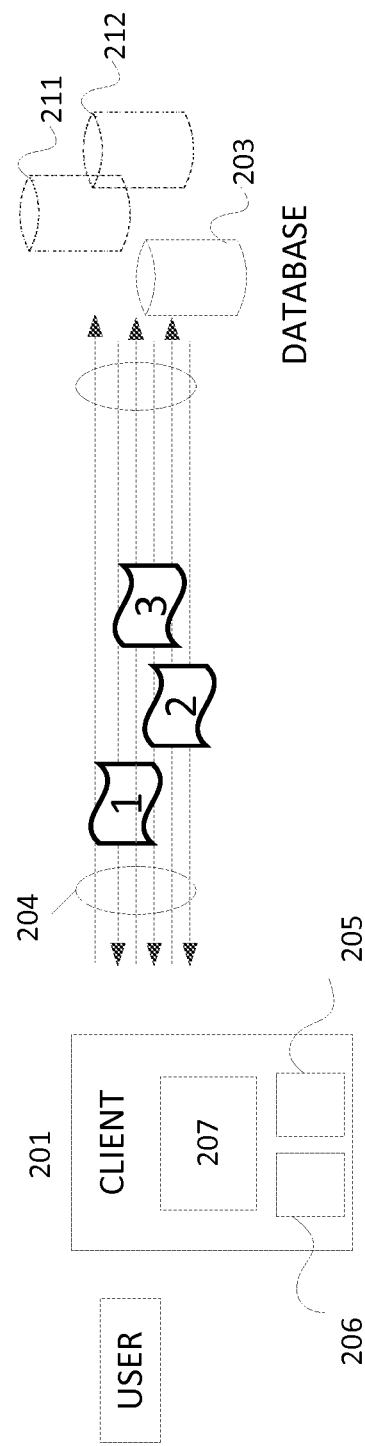

FIG. 6b

SYSTEMS AND METHODS FOR AUTOMATING THE RETRIEVAL OF PARTITIONABLE SEARCH RESULTS FROM A SEARCH ENGINE

CROSS-REFERENCE TO RELATED APPLICATIONS

This present application claims benefit of and is a continuation of U.S. patent application Ser. No. 14/815,991 filed on Aug. 1, 2015, the contents of which is incorporated herein by reference in its entirety as if recited in full herein.

FIELD OF THE INVENTION

The invention is related to systems and methods for improving the retrieval of partitionable database search results.

BACKGROUND OF THE INVENTION

Many online database search engines today focus on ranking and displaying excerpts of the most relevant search results. This is, in part, because of limits in computer memory and bandwidth for data transfer, and because users may not take the time to browse through all of the search results that match the user's criteria. As a result, many search engines are configured to find relevant search results, and then partition the search results into smaller subsets. The smaller subsets may then be retrieved and displayed upon request. Thus, an online search engine may display search results across several pages.

One exemplary system according to the prior art is shown in FIG. 1. In this system, a user may formulate a search query 101 at a client 102 and then submit the query 101 as a search request to a search engine 103. The search engine 103 may be located at a server 104 to receive and process the user's request. After receiving the user's query 101, the server 104 may then request elements in a database 105 that satisfy the user's query 101. The database 105, however, is typically configured to provide search results as discrete subsets 106 and 107. For example, the search results may be partitioned into several pages with each page containing a fraction of the total search results responsive to a query. The pages are typically sorted based on their lexical relatedness to the query or other predefined search criteria. The server 104 typically retrieves the search results from the database 105 one page at a time. For example, as shown in FIG. 1, after receiving the user's first query 101, the server 104 will retrieve the first page of search results 106 corresponding to search results 1 through 10 from the database 105. The server 104 may then return search results 1 through 10 as page one. For a user to browse to the second page of search results 107, i.e., search results 11 through 20, the user may send a second request to the server 104. In response to the second request, the server 104 may then search for, and retrieve search results 11 through 20 from the database 105. The server 104 may then return search results 11 through 20 to the user as page two.

While some search engines have optimized their ranking algorithms to increase the likelihood of providing the most relevant search results in the first few pages, several drawbacks exist. Despite these ranking algorithms, current search engines may still not provide users with the answer they are looking for. This can be because the user may not have chosen the best search terms, the user may have incorrectly constructed the query, the relevance algorithm may have failed, or the results may be so voluminous that the desired search result is difficult to discern or is inaccessible.

Specifically, some information sought by the user may not be found unless the user has access to the complete set of search results and metadata. For example, a user may not be able to identify the leading authors and keywords for a search topic or subtopic unless there is access to the complete set of authors and keywords. Likewise, a user may not be privy to the history of the topic or the full geographic distribution without access to a complete set of search results.

Further, the ranking methods employed by traditional search engines may limit the user's ability to interact with and narrow the search results. It is often the case that the first search results that will be displayed to a user are those that the ranking algorithm determines to be the most relevant. Each time a user requests an additional page of search results from the query, a new page is sent and the search engine typically does not retain the previous pages of results. Users may not readily obtain a complete picture of search results that may span across multiple pages. As a result, they may not use information that must be derived from the complete set of search results to refine their subsequent searches. If the user has the ability to view and analyze the entire set of search results, that information can be used to interactively refine the search queries.

Users interested in analyzing a complete set of search results must typically browse through all the search results by serially requesting and saving each page for offline analysis. For search results that span numerous pages, requesting and delivering each page in this way is time- and resource-intensive. Each new request may require the creation of a new internet connection and processing of new requests. Each new request may further require generating and resending data needed for drawing the user interface, which consumes considerable bandwidth. For paged search results, an entire new webpage may be generated every time a user requests another page of data, which can require the transfer of several multiples as much data as the search results themselves. This, in turn, takes additional time, and consumes additional computer resources.

Further, some search engines have structural limitations that constrain the throughput of search results. For example, some search engines limit the number of sequential requests that a user may make or limit the number of results that can be retrieved for a set of search terms. Although some search engines have attempted to increase throughput by automatically retrieving more than one page of search results per query, the requests for additional pages are still made in a serial fashion resulting in significant inefficiencies.

Some search engines have enabled users to increase the amount of search results viewable on each page. However, such engines will typically wait until the entire set of search results has been retrieved before sending it to the user's browser. And, despite displaying more results per page, a query that returns a large number of responsive search results may span across numerous pages of search results. As a result, a user may still be forced to laboriously page through long lists of search results, making it inefficient, difficult, and time- and resource-intensive to find the most salient results of the search.

Accordingly, what is needed is a system and method that automates the retrieval of a full set of partitionable search results, a system and method that performs asynchronous retrieval for the search results from the database, and a system and method that additionally allows a user to view a full set of search results and interactively explore the search results in the same interface.

SUMMARY

Systems and methods for automating the retrieval of partitionable search results from a database and reducing the latency of delivering the partitionable search results are disclosed. A user constructs a query for searching a database at a client. The database and search engine are configured to provide a set of search results that are responsive to the query. In some embodiments of the invention, a user may submit the query by sending the query as a search request to a server. When the server receives the search request, the server assigns a set of processing tasks for retrieving partitioned search results from the database. Each processing task is assigned to retrieve a subset of search results from the set of search results, and configured to execute in parallel with other processing tasks in the set of processing tasks. The use of multiple processing tasks to retrieve and deliver partitionable search results in parallel optimizes the use of server, internet and client resources. In this way, the throughput of search results and metadata is increased, and the process of narrowing or filtering search results may be better informed and becomes an interactive process for the user that extends beyond the initial query.

The processing tasks may submit requests to the database to retrieve the assigned subset of search results. The search engine searches for and retrieves the subset of search results that are requested by the server. The server may then create a response message based on the assigned subset of search results received from the database. The server may then continuously send response messages to the client until all search results responsive to the query have been retrieved from the database and sent to the client. Thus, users may access elements of an entire set of search results and associated metadata that are otherwise unavailable with traditional partitioned search results.

In some embodiments of the invention, the processing tasks may be assigned and executed on the client. The processing tasks on the client are assigned to retrieve a subset of search results and configured to execute in parallel with other processing tasks. When the processing tasks are executed, the client submits a request to the database to retrieve the assigned subset of search results. The client may then receive a response from the database which comprises the assigned subset of search results.

Systems and methods for displaying leader lists are also disclosed. After receiving a set of search results using the methods described herein, the search results may be parsed and stored at the client. The parsed search results may then be filtered based on a user selection. Metadata associated with dynamic leader list categories may then be extracted, sorted, and displayed. The extraction, sorting and displaying of the metadata may be performed independently of the client connecting to the database or server. Parsed search results may be merged with location data and other metadata. Filtered and sorted search results may be displayed in their entirety using virtual scrolling lists. Metadata may be used to filter and sort search results and visualize relationships between results using a hyperlinked map interface.

BRIEF DESCRIPTION OF THE FIGURES

The objects and features of the invention can be better understood with reference to the following detailed description and accompanying figures.

FIGS. 2*a*, 2*b*, and 2*c* illustrate systems for retrieving partitioned search results according to various configurations and embodiments of the invention;

FIGS. 6*a*, 6*b*, and 6*c* depict a client interface showing search results according to embodiments of the invention.

DETAILED DESCRIPTION

Systems and methods for automating the retrieval of partitionable search results from a database and reducing the latency of delivering the partitionable search results are described herein in relation to FIGS. 2-8. Multiple processing tasks are employed to retrieve and deliver partitionable search results in parallel, thereby optimizing server, internet and client resources. Search results and metadata are communicated in a fashion that increases throughput, permits users to access elements of an entire set of partitionable search results, and accelerates access to those partitionable search results. Further, the systems and methods described herein allow search results to be retrieved without repeatedly submitting queries or requiring a web browser to be refreshed.

Figure 1:
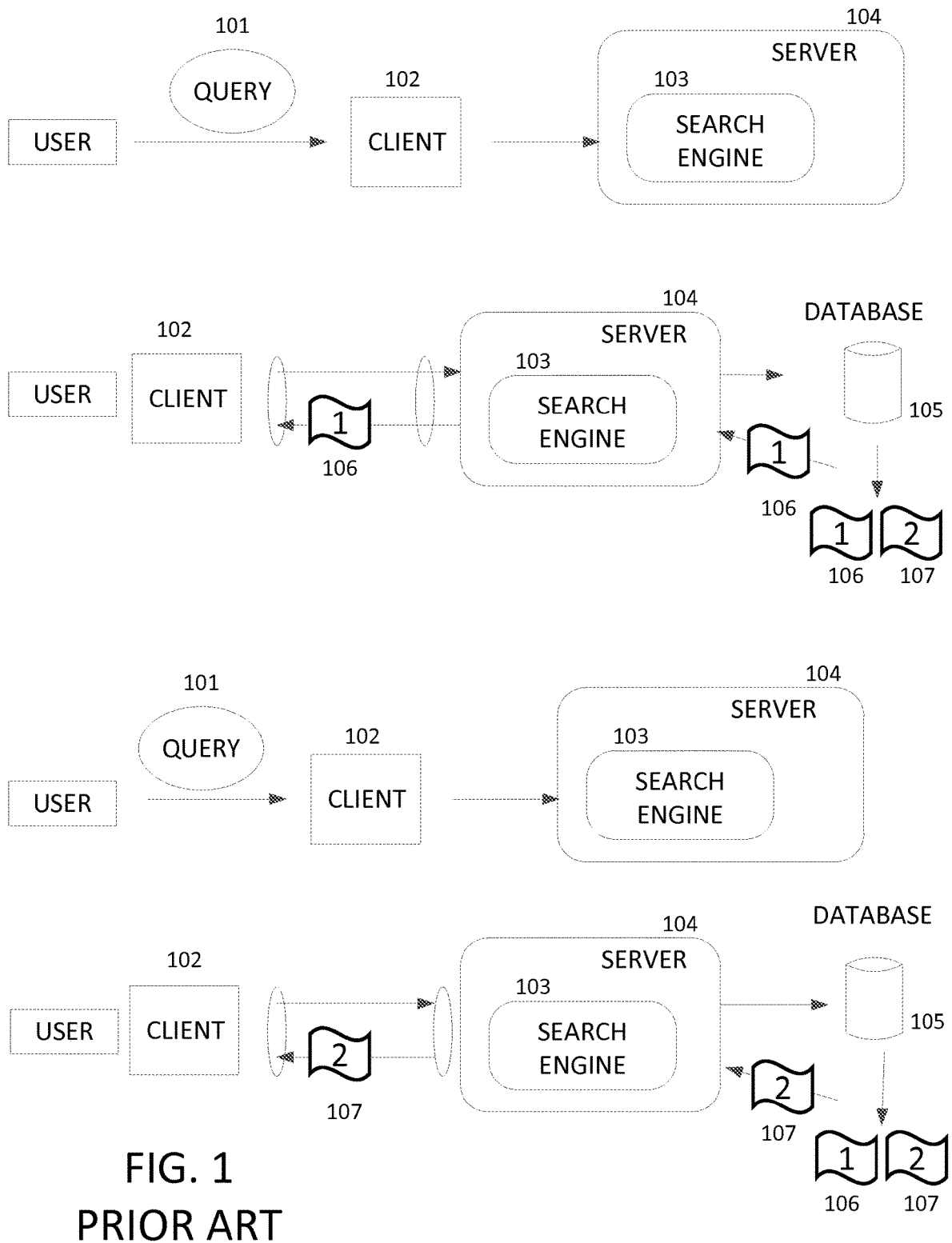
FIG. 1 illustrates systems and methods for retrieving paged search results according to some embodiments of prior art search engines.
Figure 2A:
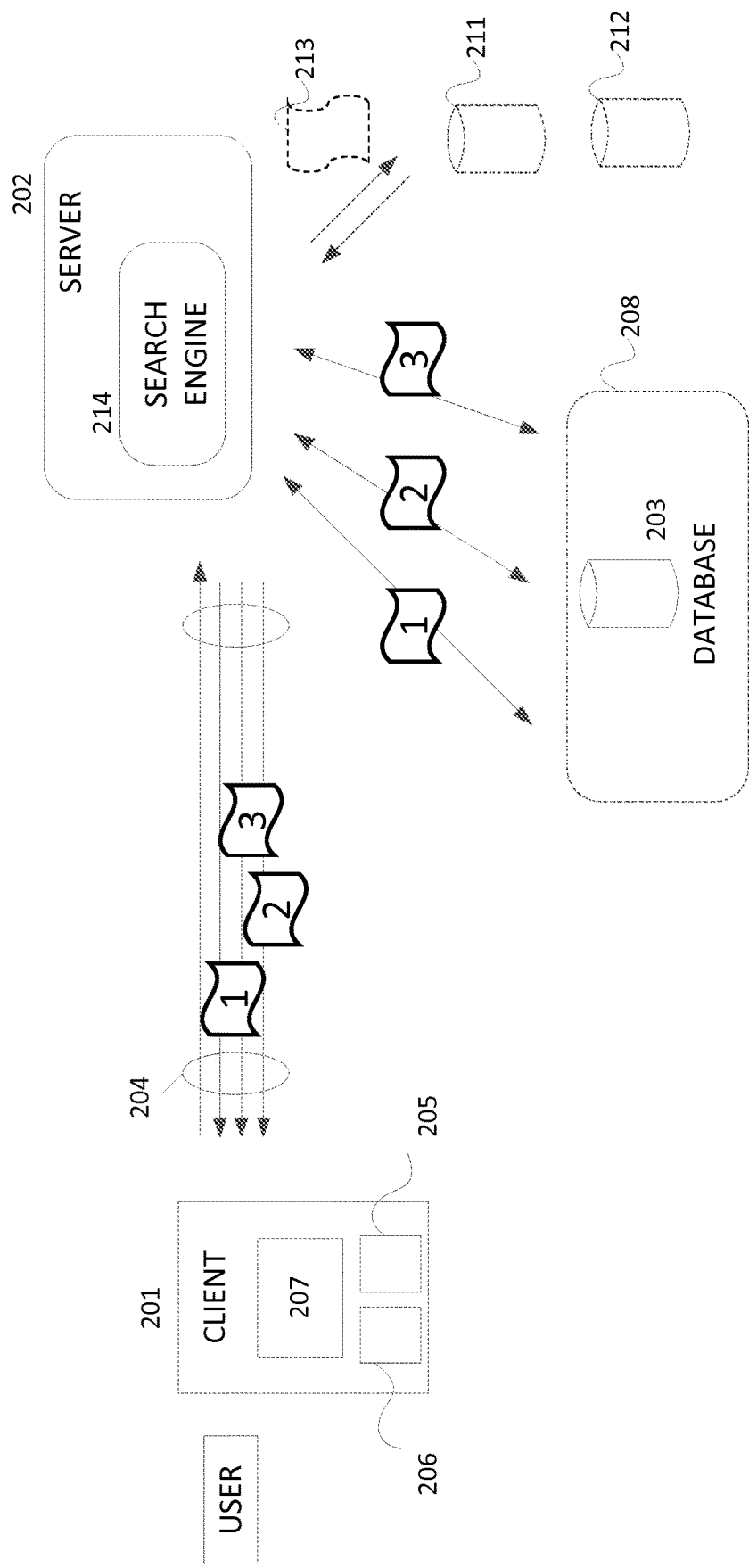
Figure 2B:
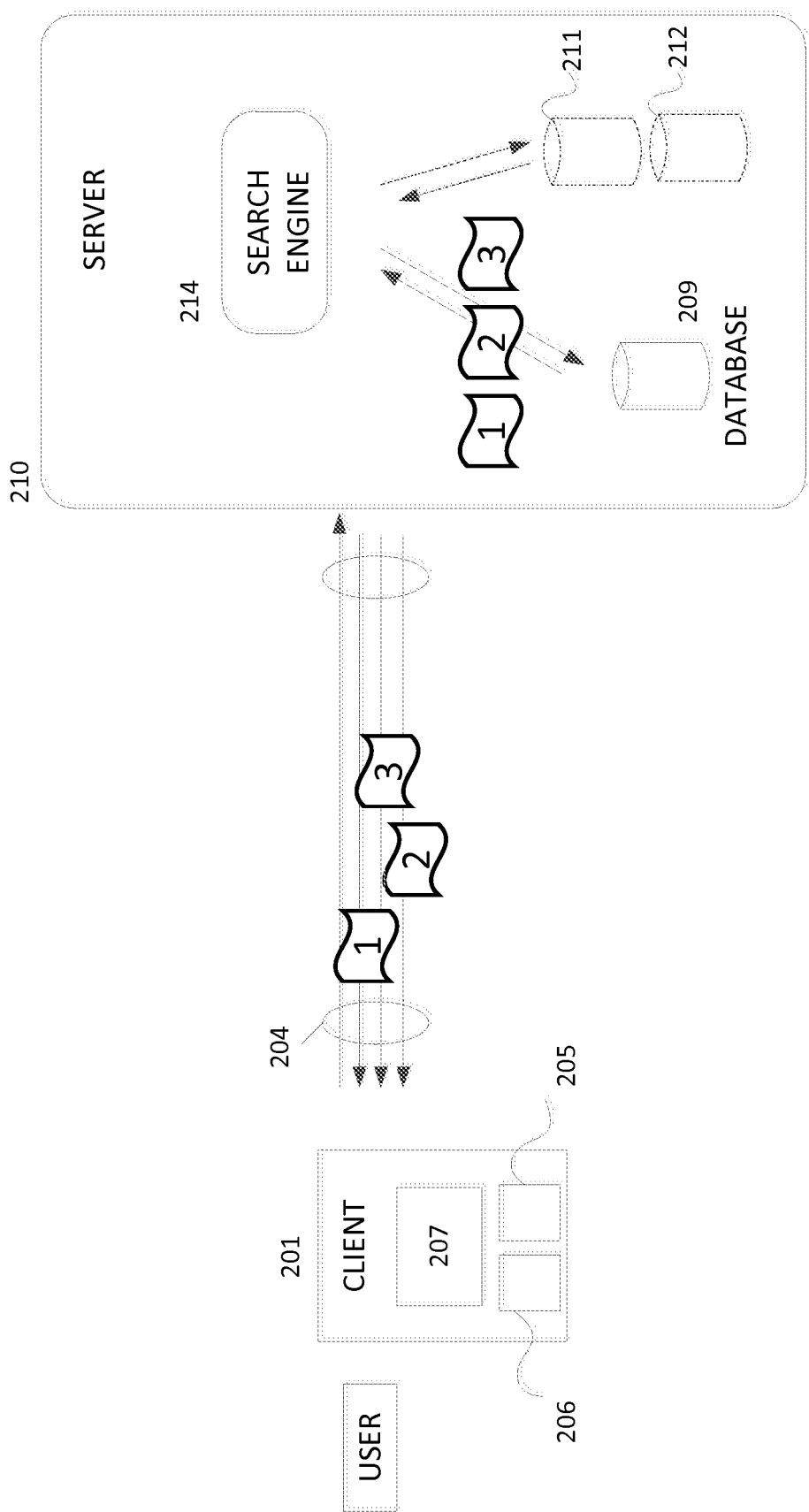

FIGS. 2*a*-2*c* depict systems for automating the retrieval of partitionable search results according to some embodiments of the invention. The systems may include a client 201, a server 202 or 210, and a database 203, 211, or 212. In reference to FIG. 2*a*, a user may initiate a search for data in the database 203 by inputting a query at the client 201. The client 201 may communicate the query as a search request to the server 202 over a connection 204. The server 202 may receive search requests from the client 201, and may retrieve search results from the database 203 that are responsive to the user's query. In some embodiments of the invention, the search results may be partitioned into smaller discrete subsets of search results before being retrieved by the server 202. For example, the search results may be partitioned by the search engine 214 before they are retrieved by the server 202. The server 202 executes multiple processing tasks in parallel, allowing each subset of search results to be retrieved in parallel. In yet further embodiments of the invention, the search results may be sent as a single set of search results from the database 203, and are subsequently partitioned into smaller subsets of search results, such as for example at the server 202. For each subset of search results, the server 202 may create and send a response message to the client 201. A response message may include the subset of search results retrieved from the database and metadata associated with the subset of search results. The server 202 may continuously send response messages to the client 201 until all search results responsive to the query have been retrieved from the database 203 and sent to the client 201.

The client 201 may comprise a processor 205, a memory system 206 for storing data including search results and metadata, and an interface 207 for a user to input a query and view search results and metadata. According to some embodiments of the invention, the client 201 may be a browser-based application for requesting, receiving, and rendering information on a network. For example, the client 201 may be an internet browser, and the interface may be a webpage displaying one or more input fields by which the user may construct a query. Each input field may correspond to a search term or search parameter that specifies the criteria of the query. According to some embodiments of the invention, the information in the input fields are captured and stored in the browser's memory as an object or data structure. The data structure may be for example an array, and each search term or search parameter entered by the user may be stored in a separate cell of the array. When the user submits the query, by for example selecting a submit button, the browser may traverse through the object or data structure, and add each search term or search parameter into a message that is passed to the server 202 by for example an HTTP request. As explained in more detail below, the client 201 may communicate to the server 202 over one or more connections. The client 201 and the server 202 may asynchronously communicate information without requiring a page refresh, or they may stream the information by communicating packets of data over time. According to some embodiments of the invention, search terms or search parameters may be sent to the server 202 without requiring the client 201 to create and submit a new page request or page refresh. For example, using an asynchronous protocol such as WebSocket, the search terms and search parameters may be passed to the server 202 as a message without requiring a page refresh.

Although several examples describe the client 201 in the context of a web browser, according to some embodiments of the invention, client 201 may also be an application capable of running independently of a browser. For example, client 201 may be a standalone desktop application. The standalone desktop application may be run without launching an internet browser. Client 201 may also be a mobile application running on a mobile device, or a plug-in application, such as for example, an Adobe Flash application. Client 201 may also be a virtual environment or simulate a computer desktop.

A query may comprise a search term, a geographic location, a date range, natural language inputs, searchable non-semantic input, such as picture, video, audio, or similar input, or some combination of each that defines the parameters of the search. A search engine for audio input may be, for example, Sound Hound, and a search engine for picture input may be for example Google Goggles. Search engine 214 may find search results that best match the parameters specified in the query. In one aspect of the invention, the search parameters may be applied to the data stored in the database 203, as well as metadata associated with the data in the database 203. For example, if the database stores journal articles, search terms may be applied to the full-text of the articles, as well as the metadata of those articles, such as their title, author, organization, affiliation, or abstract. A search term may be a string of letters, numbers, symbols, the location of a non-semantic input file, such as the input file of a picture, video, or audio file, or a combination of each. According to some embodiments of the invention, search engine 214 finds search results that are lexically or otherwise related to the search terms specified in the query. A geographic location may be a city, a state, a zip code, a set of coordinates, or similar type of bounded region. A date range may be defined by a start date and end date. Search engine 214 may find matching search results by determining which search results fall within the specified date range. For example, if the search results comprise publications by academic institutions, the search engine 214 may identify only those publications that were published within the specific date range.

Server 202 receives search requests from a client 201 over one or more connections 204. According to some embodiments of the invention, the server 202 may be a web server that receives requests and provides responses to browser-based clients. For example, the server 202 may receive the user's query as an HTTP POST or GET request from an internet browser. If the client and server communicate according to the WebSocket protocol, then the request may be passed to the server as described above. In some embodiments of the invention, the server 202 comprises one or more processors and memory systems for executing multiple processing tasks in parallel. As explained in more detail below, the processing tasks are assigned to retrieve subsets of search results from the database 203. In some embodiments of the invention, the number of processing tasks that may be executed in parallel may be specified, by for example a server administrator.

In some embodiments of the invention, the server 202 retrieves search results from the database 203 over a network connection. For example, the server 202 may communicate to the database 203 over the internet. As explained in more detail below, each processing task may create and use a separate connection to communicate information to and from the database 203. In one aspect of the invention, the server administrator may set a limit as to the total number of connections that are permitted at one time. For example, the server administrator may limit the number of connections for a particular instantiation of the PubMed® database to 50. Accordingly, when server 202 receives a query, 50 connections are concurrently established to the PubMed® database, and can each be used to retrieve search results independently and in parallel with respect to each other. The maximum number of connections may be derived based on, for example, empirical studies on server and database performance, and selected to optimize the speed at which search results are returned. The number of connections may be increased to accommodate large numbers of simultaneous connections through the use of multiple servers and mirrored databases. If the total number of requests needed to retrieve the search results are greater than the total number of allowed connections, then the requests and processing tasks may be organized using a queue as described in more detail below.

Database 203 receives requests for data and provides search results to server 202. According to some embodiments of the invention, the database may be a web service, such as for example PubMed®. The server 202 may retrieve data from the database 203 using an application programming interface ("API") defined by the web service. For example, server 202 may retrieve data from the PubMed® database using a JSON API by submitting an HTTP POST request to the PubMed® server URL (e.g., http://eutils.ncbi.nlm.nih.gov/entrez/eutils/esearch.fcgi). In response, the PubMed® database may return search results to the server or the client.

In one aspect of the invention, the search engine 214 partitions the search results that are responsive to a user's query. The search engine 214 partitions these search results into smaller discrete subsets which are then requested by the server 202. Each subset of search results may be a fraction of the search results that are responsive to the user's query. According to some embodiments of the invention, the maximum size for each subset may be specified. For example, the server 202 may specify that each subset of search results includes a maximum of 10 search results. Thus, a query that yields 50 search results may be partitioned into 5 subsets, each subset comprising 10 search results. Server 202 then retrieves each subset by submitting a request for a specific partition of search results. For example, server 202 may request the first subset of search results, i.e., search results 1-10, or the second subset of search results, i.e., search results 11-20.

According to some embodiments of the invention, the database 203 may be a remote database accessible by a second server 208 over a network connection. For example, the remote database may be in a different location or domain than the first server 202, and a second server 208 may be used to facilitate communication and retrieve information from the remote database. In some embodiments of the invention, the second server 208 may be a request-response server. The first server 202 may send the second server 208 a message that includes a request for search results, and the second server 208 may return a response with matching search results. In some embodiments of the invention, the request-response server may be an HTTP server or application server. For example, the database 203 may be a web service such as the PubMed® database that is accessible by PubMed's® server 208 via the internet. The first server 202 may retrieve subsets of search results from the remote database by submitting an HTTP request, such as for example a GET or POST request, and the second server 208 may provide an HTTP response that includes the search results. In other embodiments of the invention, a database 209 may be local to a server 210, as shown in FIG. 2b. For example, a local database 209 may be a database of data, and may provide information directly to the server, i.e., without submitting a response over the internet.

As FIGS. 2a and 2b show, in one aspect of the invention, the server may retrieve information from additional databases 211-212. Additional databases 211-212 may provide information that supplements the search results provided by database 203. For example, to supplement the search results of a query the server 202 may retrieve metadata such as for example, the geographic information associated with a search result. The server 202 may then combine the geographic information with the search results and send the combined information to the client 201. The additional databases 211-212 may be remote databases or local databases as described above. In some embodiments of the invention, the additional remote databases 211-212 may be accessible by additional servers, in the same manner as second server 208.

Connections 204 facilitate the communication between the client 201 and the server 202. In one aspect of the invention, connections 204 are configured to allow server 202 to stream subsets of search results to the client 201. Search results are streamed by continuously sending the subsets of search results to the client 201 throughout the time period search results are being retrieved. Because subsets of search results are retrieved from the database 203 in parallel, the server may asynchronously send the other subsets of search results being retrieved to the client 201. For example, server 202 may send a first subset of search results as soon as it is retrieved from the database 203. Subsets of search results that the server 202 subsequently receives, such as a second or third subset of search results, may also be sent to the client 201 as soon as they are received, without any further action by the user. The server 202 may continue to send search results that have been subsequently received until all the search results have been retrieved from the database 203. From the client's perspective 201, the subsets of search results are being sent continuously.

According to some embodiments of the invention, the connection may be implemented with a streaming protocol. In embodiments where the client 201 is a browser-based application, the streaming protocol enables a search to be processed within the existing webpage without necessitating additional page requests or page refreshes as a traditional search engine may require. A streaming protocol connection may include, for example, the WebSocket protocol, the Comet protocol, the TCP protocol, or the UDP protocol. In other embodiments of the invention, non-streaming protocols may be adapted to facilitate communication between the client and the server 202. For example, the connection may be implemented with XMLHttpRequests that are configured to execute asynchronously to other connections that may be established or tasks that the client may execute. The XMLHttpRequests may then provide event listeners that monitor the loading of the response messages from the server 202.

As shown in FIGS. 2a and 2b, the server 202 executes processing tasks that retrieve the subsets of search results from the database 203. As described in more detail below, the server accomplishes this by assigning and executing processing tasks for retrieving the subset of search results in parallel. However, according to other embodiments of the invention, the client 201 may perform these steps, as shown in FIG. 2c.

Figure 3:
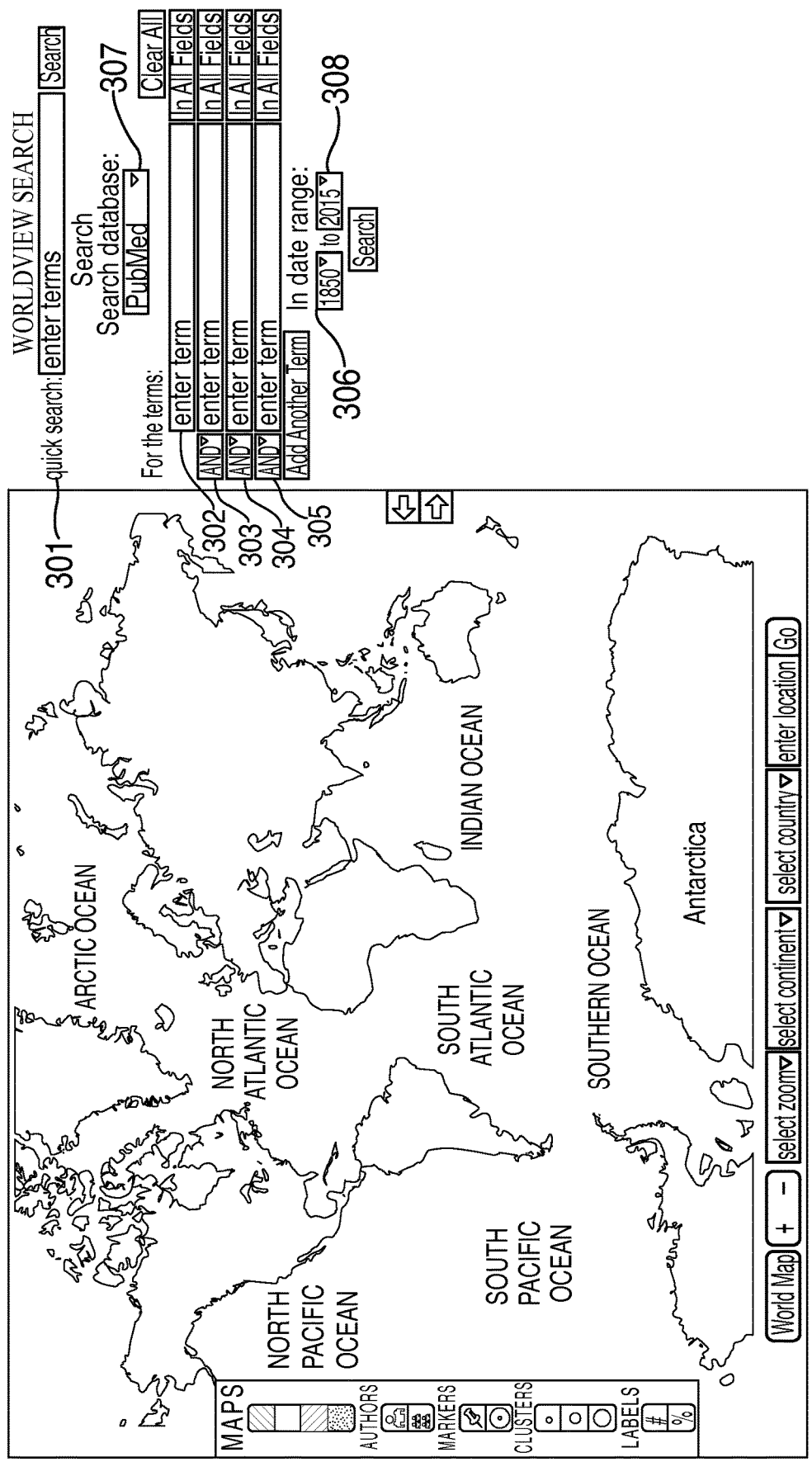
FIG. 3 illustrates a client interface according to some embodiments of the invention.

An exemplary user interface for constructing a query is shown in FIG. 3. According to some embodiments of the invention, the input fields 301-307 and submission button 308 may be displayed on a webpage of a browser. In other embodiments, the input fields 301-307 and submission button 308 may be rendered in a plugin, or a standalone application. The interface may include input fields 301-307 by which the user may construct a query. Input fields enable the user to enter search terms or select search parameters that specify the criteria of the query. For example, the interface may include a quick search box 301 that allows the user to enter a string of letters, numbers, or symbols, or any combination of each. The client then submits the string entered in quick search box 301 as a query. The interface may further include search boxes 302-305 that allow the user to find search results with metadata that matches certain parameters. For example, if the user is searching for publications from the PubMed® database, the user may specify from a menu of choices (302-305) what search terms or search parameters are in all fields, the publication's text, its title, the author's name, or the name of the journal. The user may use Boolean operators (for example, AND, OR, NOT) to combine search terms. According to some embodiments of the invention, the user may temporally constrain the query by specifying a start and end date 306. The user may select which database to retrieve search results from with a database dropdown box 307. When a user has finished constructing the query, the user may submit the query by selecting the search button 308.

In one aspect of the invention, partitionable search results may be retrieved from multiple users and/or different queries requested concurrently. For example, two users may each submit different queries to the server 202 at the same time. In some embodiments of the invention, the server 202 may retrieve the search results for both queries in parallel. As described in more detail below, the server 202 may retrieve the search results for both queries in parallel by interleaving requests for subsets of search results from the database. In this way, the retrieval of the partitionable search results is scalable to large numbers of users.

Figure 4:
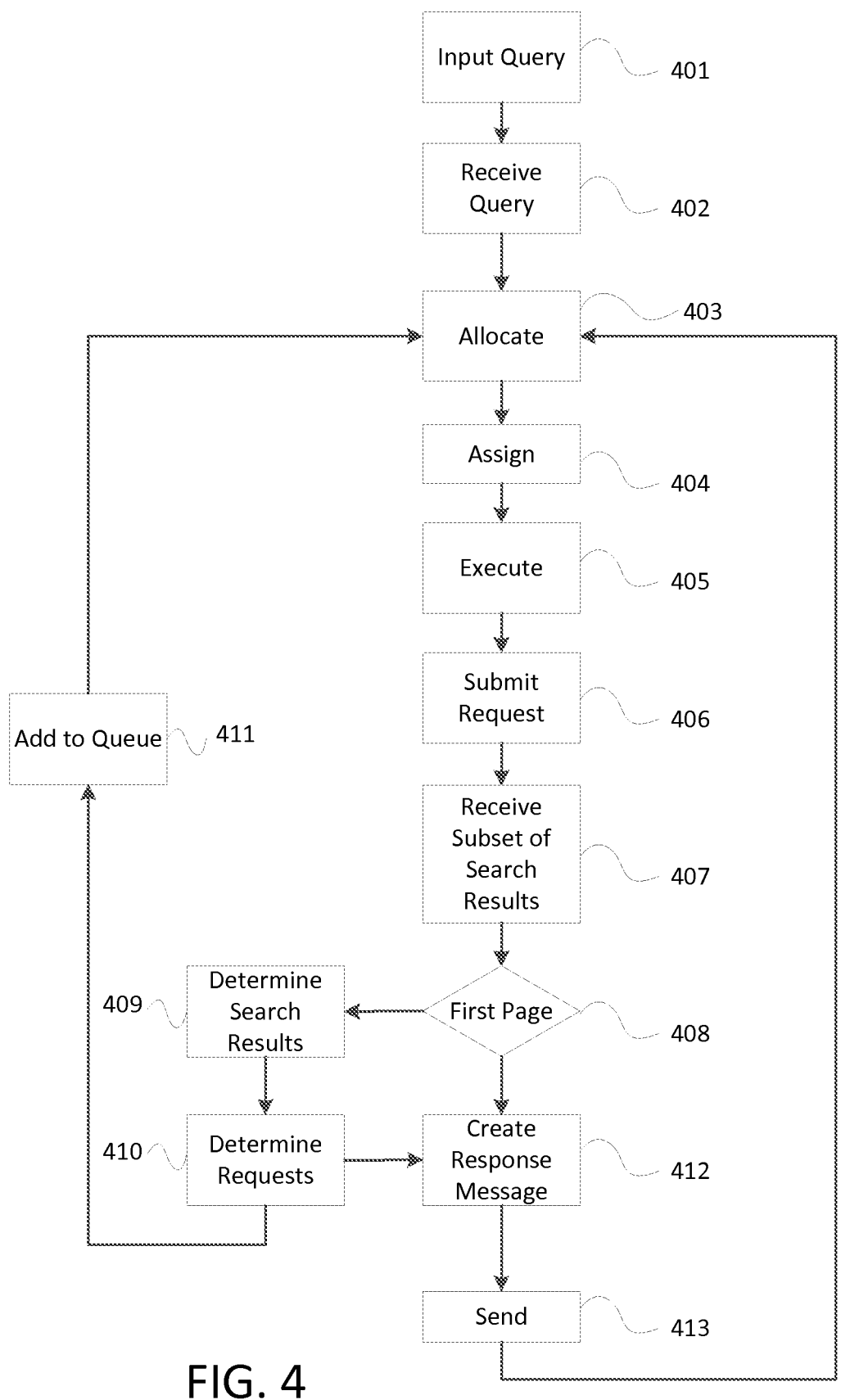
FIG. 4 illustrates a method for retrieving partitioned search results according to some embodiments of the invention.

A method for automating the retrieval of partitionable search results from a database according to some embodiments of the invention is shown in FIG. 4. A user may begin by inputting a search query into a client, as shown in step 401. As described above, client 201 may be a browser-based application that communicates to server 202 over the internet. In these browser-based embodiments, when a user submits the query, the browser-based application may encode the information in each input field into a message. The client 201 may then communicate the message as a search request to the server 202.

Server 202 may receive the search request from the client 201, as shown in step 402. The server 202 may then parse the encoded message to determine what search terms and search parameters were input by the user. Once the server 202 has parsed the search terms and search parameters, the server 202 may submit requests for subsets of search results to the database 203.

As discussed above, the server 202 may include multiple processing tasks for requesting subsets of search results from the database 203 in parallel. In order to determine how many processing tasks are needed to retrieve the full set of search results, the server 202 may determine how many total search results are responsive to a query. In some embodiments of the invention, the total number of search results responsive to the query are determined by the initial request to the database 203. After receiving a query 402 and allocating processing threads 403, the server may submit the initial request by assigning a first task for retrieving a first subset of search results and executing first task as shown in steps 404-408. If the server determines that it has assigned a first task for retrieving the first subset of search results as shown in step 408, the server may then determine the total number of search results as shown in step 409, and the number of requests to the database as shown in step 410. Specifically, if it is the server's initial request for the search, the database 203 may provide metadata in addition to the subset of search results. Metadata from the initial request may comprise the total number of search results that are responsive to the user's query, as shown in step 409. The server 202 may then calculate the total number of requests that are needed to retrieve the full set of search results based on the metadata and the size of each subset of search results, as shown in step 410. For example, if the metadata indicates that there are a total of 50 search results responsive to the query, and the maximum size of each subset of search results is 10, then the server will need to submit a total of 5 requests to the database in order to retrieve the full set of search results. This information is then fed back to a queue, shown in step 411, in order to allocate processing threads and assign further processing tasks for servicing the query, as shown in steps 403 and 404. Because the initial request also retrieves a first subset of search results, the server may also create a response message 412 as described in more detail below.

The server 202 may assign a set of processing tasks in step 404 based on the total number of requests needed to retrieve the full search results. For example, if the server 202 needs to submit 5 requests to the database 203, the server 202 may assign a set of 5 processing tasks to execute the requests to the database 203 in parallel. As discussed above, the server 202 may request a specific subset of search results. The server 202 assigns a processing task to each subset of search results that need to be requested from the database 203. As described in more detail below, processing tasks are assigned to processing threads which are then executed to retrieve the subset of search results as shown in step 405. For example, the server 202 may assign one task to retrieve search results 11-20, while another task may be assigned to retrieve search results 21-30. In this way, the server 202 automates the retrieval of an entire set of search results.

In one aspect of the invention, each processing task may execute in parallel to the other processing tasks running on the server 202. Thus, for example, the server 202 may submit 5 requests to the database 203 in parallel, instead of submitting each request one-by-one, in a serial fashion. Because the processing tasks are executing in parallel, the server 202 may receive subsets of search results concurrently to, or even simultaneously to each other. A processing task may also be asynchronous to the other processing tasks, and may take a shorter amount of time to retrieve subsets of search results than other processing tasks. As a result, the total 5 subsets of search results may be delivered to the server 202 sooner than if they had been requested in a serial manner. In this way, the overall latency in retrieving subsets of search results from the database 203 is reduced.

Figure 8:
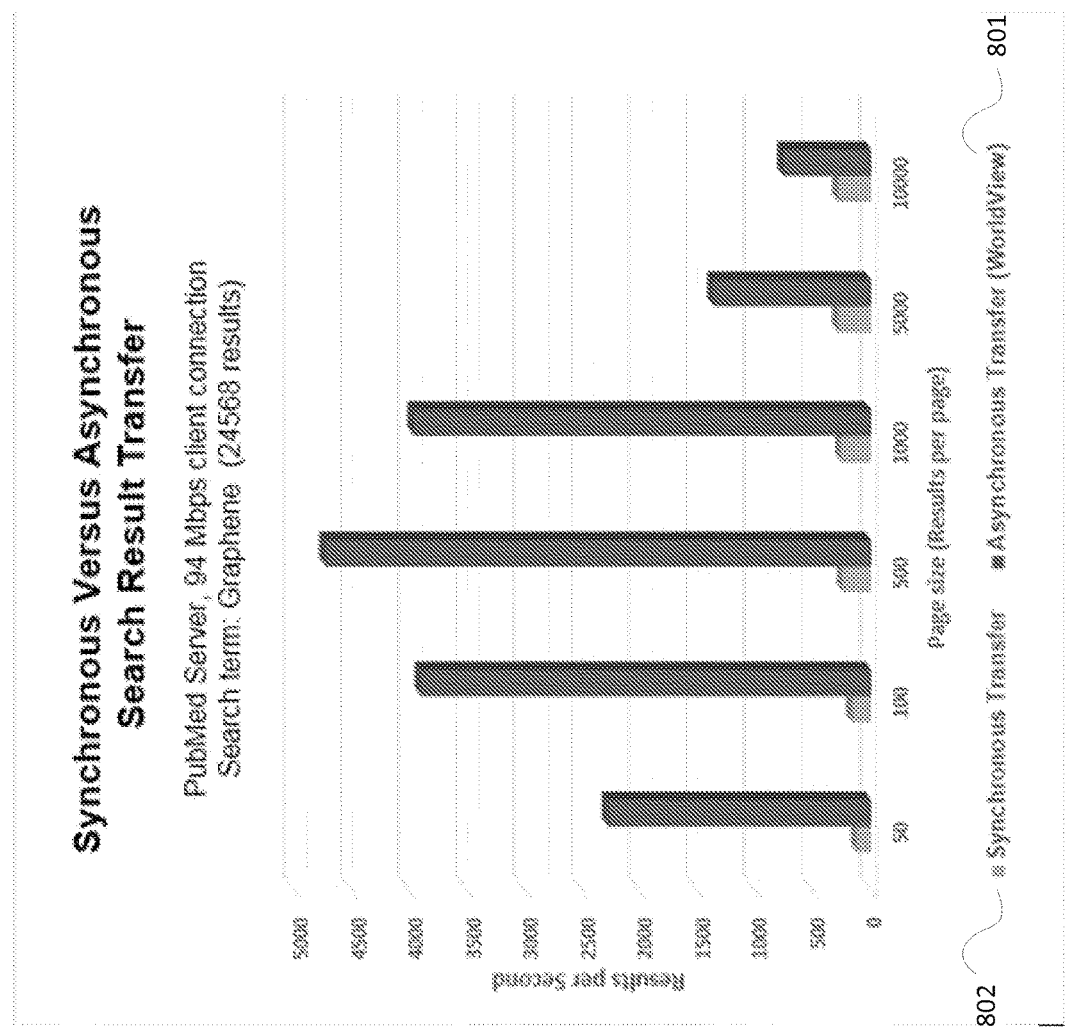
FIG. 8 is an exemplary chart of the results of a benchmark test showing the improvement in performance of the methods and systems described herein over prior art methods and systems.

FIG. 8 is a benchmark chart showing exemplary improvements in the performance of retrieving partitioned search results when the partitioned search results are retrieved using aspects of the methods and systems described herein. The chart shows performance as measured by the rate of search results transferred per second. The chart compares the performance of a multithreaded asynchronous system 801 according to some embodiments of the invention, to a single synchronous system according to prior art systems 802. The benchmark tested a query containing the search term "Graphene" retrieved from the PubMed® database using a 94 Mbps client connection. The graph shows the results for various page sizes sent by the server, while all other parameters remained constant. As the chart shows, the systems and methods described herein achieved a 1974% increase in performance over prior art systems, and a several-fold reduction in latency. Greater speed improvements may be realized through further optimizations.

As shown in step 405, the server 202 executes the set of processing tasks. For each processing task that is executed, the server 202 submits a request to the database 203 as shown in step 406 to retrieve the assigned subset of search results. The database 203 provides a subset of search results in response to the request 407. In some embodiments of the invention, the database 203 provides the server 202 with the search results, the relative rank and/or score of each search result, and metadata related to each search result. For example, the PubMed® database may provide publications as search results and include metadata such as each publication's authors, keywords, and year of publication. In some embodiments of the invention, the server 202 may encode the search results and all the received metadata as a response message to the client 201. In other embodiments, the server 202 may parse the metadata and selectively include specific types of metadata, such as author or date of publication, thereby reducing the size of each response message sent to the client 201. In another aspect of the invention, the subsets of search results may be received by the server 202 in a format that needs to be parsed and converted before sending the subset of search results to the client 201. For example, the database 203 may provide the subset of search results in a JSON format with a large amount of additional metadata that is irrelevant to the requested subset of search results. The server 202 may repackage the relevant information as a response message as shown in step 412, which excludes any unused or irrelevant information. As soon as the response message has been created, the server may then send the response message to the client 413. In some embodiments of the invention, the response message may be an HTTP response, and the subsets of search results may be contained within the HTTP response.

In one aspect of the invention, the set of processing tasks execute in parallel and continuously send response messages to the client 201 until all search results responsive to the query have been retrieved from the database and sent to the client 201. As described above, the processing tasks execute in parallel, and therefore the database 203 may provide subsets of search results to the server asynchronously. For example, a database 203 may take several extra milliseconds to find search results 21-30 in comparison to search results 1-20. Thus, the server 202 may receive search results 21-30 slightly after search results 1-20. As described above, as soon as response messages including search results 1-20 are created, the server sends the response messages to the client 201. The server 202 then will continue to send response messages by sending search results 21-30 as soon as they have been received from the database. The server 202 may continue to deliver search results in this manner until all search results responsive to the query have been delivered.

Client 201 may receive response messages in parallel and continuously.

For example, server 202 may send two response messages corresponding to search results 1-10, and 11-20, which the client 201 may receive in parallel. Client 201 may then begin parsing and displaying search results in the response. The server 202 may continue to send response messages to the client 201 as described above, while the client 201 is parsing and displaying response messages. Thus, for example, as client 201 parses the response messages corresponding to search results 1-10, and 11-20, the server 202 may send and the client may receive a subsequent response message corresponding to search results 21-30. As another example, the client 201 may be displaying subsets of search results 1-10 and 11-20 while response messages from the database, such as the subsequent response message corresponding to search results 21-30, are still being received. The client 201 may continuously receive response messages until all response messages responsive to the user's query have been retrieved from the database 203. From the perspective of the user, after he or she has submitted a query, all the responsive search results are loaded continuously without the user having to browse to subsequent pages of search results, or send additional requests for search results.

In one aspect of the invention, the client 201 may store the search results and metadata encoded in each response message it receives in a local memory system 206. In embodiments where the client 201 is a web browser, the client 201 may for example, store the search results and metadata as objects in the browser cache. As described in more detail below, the client 201 may then perform additional processing on the search results independently of a connection to the server 202 or database 203. For example, the client 201 may filter, sort, or rearrange the search results without submitting another request to the database. In this way, the system may enable a user to perform processing on the search results when the client 201 is offline or otherwise has no connection to a database 203 and/or server 202.

In one aspect of the invention, the server 202 organizes the processing tasks that perform the retrieval of subsets of search results according to a queue. Processing tasks for retrieval of search results that have not yet been assigned to a processing thread are added to the queue. For example, a server 202 may be specified to run a maximum of 2 processing threads in parallel, and the server 202 may retrieve 5 subsets of search results, each containing 10 search results. The first processing task may be added to the queue, where it is assigned to a processing thread to retrieve search results 1-10. Once the first processing task is assigned, the server determines if there are additional pages needed, and if so, adds an additional processing task to the queue. For example, the server may add a second processing task to the queue, where it is assigned to the second processing thread to retrieve search results 11-20. When the first or second processing thread begins executing the retrieval of search results for the first or second processing task, the server determines if there are additional search results to retrieve, and if so, adds another processing task, e.g. retrieve search results 21-30, to the queue. The server repeats this process until the remaining subset of search results that have not yet been added to the queue, e.g., 31-40, or 41-50, have been assigned to a processing thread. Each processing task specifies which subset of search results to retrieve (e.g., search results 1-10, 11-20, 21-30, 31-40, or 41-50).

When server 202 determines that the queue contains at least one unassigned processing task for a subset of search results and there is at least one available processing thread, the server 202 removes the unassigned processing task from the queue, and assigns that processing task to the available processing thread. The processing thread then executes the processing task to retrieve the subset of search results. A processing thread may become available when, for example, the assigned subset of search results are retrieved. According to some embodiments of the invention, the queue may be a linked blocking queue. A linked blocking queue is an optionally-bounded blocking queue based on linked nodes that orders its elements in a first-in first-out manner.

In one aspect of the invention, the queue may comprise processing tasks for retrieving partitioned search results from multiple users and/or different queries requested concurrently. For example, two users may each submit different queries to the server 202 at the same time. In response to the two queries, the server 202 may create two groups of processing tasks: a first group corresponding to subsets of search results for the first user, and a second group corresponding to subsets of search results for the second user. The server 202 may then retrieve two distinct sets of search results by adding both the first and second group of processing tasks to the queue. According to some embodiments of the invention, the processing threads may be evenly divided among the multiple users by alternating between the groups of processing tasks. For example, if the server 202 receives a first search request from a first user and a second search request from a second user, the server 202 may interleave the order in which processing tasks for the first and second search requests are added to a queue. Thus, processing threads are assigned to each user evenly, because the allocation of available processing resources alternate between retrieving subsets of search results for the first and second users. In this way, the retrieval of partitionable search results is scalable to large numbers of users. By sharing the queue over multiple servers, additional processing resources can be employed to accommodate larger numbers of users and simultaneous search requests.

According to other embodiments of the invention, users or groups of processing tasks may be prioritized over other users or processing tasks. For example, the server 202 may determine that the first user's query takes priority over the second user's query. If the server 202 determines that the user or query has a high priority, the server 202 may then add processing tasks from the high priority group to the queue ahead of processing tasks from a lower priority group. Thus, for example, search results for the first user's query may then be requested and retrieved ahead of the search results for the second user's query. In other embodiments, processing tasks from a higher priority group may be added to the queue sequentially as part of the same cycle. For example, a high priority search with 10 pages of search results may be prioritized by adding each of the 10 processing tasks to the queue in a row, before adding one pointer from a lower priority search.

A server may determine the priority of a processing task within the queue based on the user, the query, or other rules defined by an administrator. For example, rules may be specified that prioritize users with paid-subscriptions over non-paying users. Specifically, the system may maintain each user's identification and other user information such as whether they are paying or non-paying users. The rules may then provide that the server will add two pages of search results requested by a paying user for every one page of search results requested by a non-paying user. As another example, each user may be assigned a priority level, and the server 202 may maintain a table or database of users' IDs and their priority levels. As yet another example, the server 202 may assign a particular query a high priority, because the nature of the query may be computationally complex requiring a high number of processing tasks, or the user may have an urgent need for the particular search results.

As described above, in some embodiments of the invention, the server 202 retrieves partitioned search results from the database 203 over a connection. Typically, connections are closed after the transfer of results has been completed. However, according to some embodiments of the invention, the connections between the server 202 and the database 203 may be reused for different processing tasks. After a request from the database 203 has been completed, instead of closing the connection, the server 202 leaves the connection open and marks it available for reuse for another processing task. Processing tasks that are ready to request a subset of search results from the database 203 may first check whether there is a connection that has been left open and marked available for reuse. Before making a request to the database 203, the processing thread thus checks for open and available connections. If a connection is open and available for reuse then the processing thread uses that connection to submit a request for a subset of search results. In this way, fewer connections are created when a user initiates a search. Because the creation of connections consumes processing power and bandwidth, reusing open and available connections improves efficiency and reduces processing overhead in the retrieval of partitionable search results.

In some embodiments of the invention, the connections may be maintained with a pooling HTTP client connection manager. The pooling HTTP client connection manager may maintain a pool of HTTP connections to specific locations, and may service connection requests from processing threads. The connection manager may determine when a thread has finished using an HTTP connection to the database, and may then release the HTTP connection for reuse.

The processing threads may also be managed with the use of a thread pool executor. A thread pool executor may include a pool of threads, and a queue of tasks that are waiting for execution. The thread pool executor may allocate threads from the pool of threads to the task for execution. When there are more tasks than threads, some tasks will remain in a wait state until a thread has become available.

In some embodiments of the invention, the server 202 may request information from more than one database as shown by the process in FIG. 2a. In some embodiments, the additional databases may be accessed over different connections, and may have their own queues for managing those connections. These additional databases may, in turn, be used to supplement retrieved search results with additional data. For example, a subset of search results may include the titles of several publications. The subset of search results may further contain metadata such as the authors of the publications and temporal information about the date of publication. The server 202 may parse the author information as parsed metadata. The server 202 may then retrieve information relating to the parsed metadata from a second database 213. For example, the server 202 may retrieve geo-spatial information about the author, such as the geographic location of his or her academic affiliation. The server 202 may then add the information retrieved from the second database to the response message that is sent to the client 201.

According to some embodiments of the invention, the server 202 may filter the subsets of search results retrieved from the database 203. The server 202 may determine whether each search result in the subset satisfies additional criteria that may have been specified by the user. For example, the user may limit the search results to a particular date range. When the server receives subsets of search results, it may then remove any search results that do not match the specified date range before sending a response message to the client 201.

Figure 5:
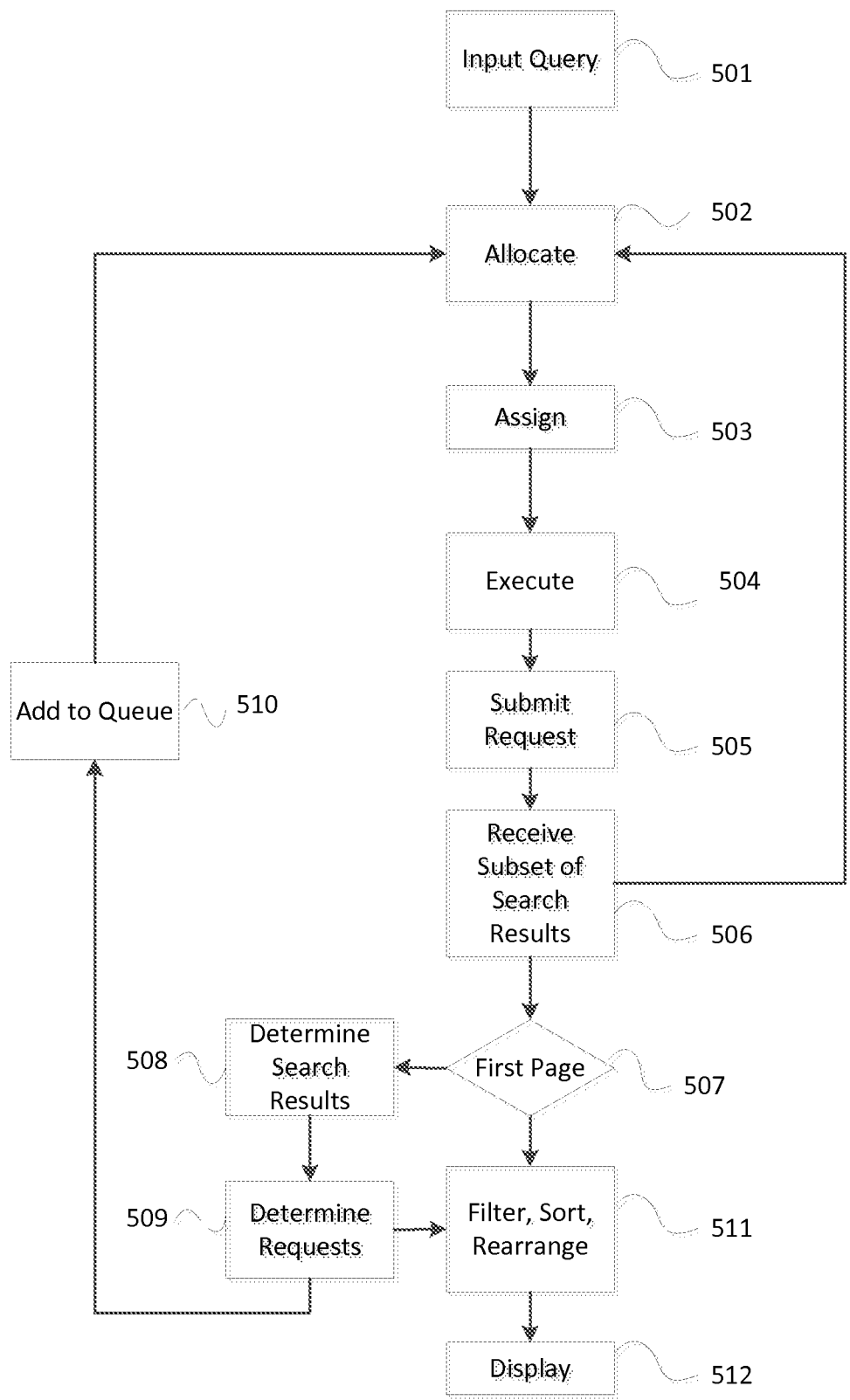
FIG. 5 illustrates a method for retrieving partitioned search results by executing parallel processing tasks at a client according to embodiments of the invention.

According to some embodiments of the invention, processing tasks may be executed on the client 201 instead of the server 202. This allows embodiments where the client 201 may retrieve the search results from the database 203 directly, without communicating to a server 202 as shown in FIGS. 2c and 5. The database may be a remote database or local to a server and/or search engine. As described above, the client may be a browser or an application capable of running independently of a browser. The client may be multi-threaded; i.e., capable of running multiple threads in parallel. As described in more detail below, the client may also be single-threaded and does not run multiple threads in parallel.

In some embodiments where the client is multi-threaded, after a user submits a query 501 and processing threads have been allocated 502, the client 201 may determine how many processing tasks are needed by assigning a first task for retrieving a first subset of search results and executing steps 503-510 in a similar manner as described above in reference to steps 404-410. As with the server 202, client 201 may comprise one or more processors and memory systems for executing multiple processing threads in parallel. As described above, when the client determines that it is the initial request, as shown in step 507, the client may then determine the total number of search results as shown in step 508, and the number of requests to the database as shown in step 509. In step 503, the client 201 may then assign processing tasks to retrieve each subset of search results from the database 203, as described above. If there are more processing tasks than available processing threads, then the client 201 may assign processing tasks to processing threads in an order determined by a queue as described above.

Processing tasks for retrieval of search results that have been assigned a thread are executed in step 504 by submitting a request to the database in step 505, and receiving a response from the database comprising the assigned subset of search results in step 506. In some embodiments of the invention, the client 201 may send requests to multiple servers and/or databases located at different locations or domains. The client 201 may facilitate this type of communication using cross-domain Ajax, such as JSON-with-padding ("JSONP"), or Cross-Origin Resource Sharing ("CORS").

In other embodiments, the client may be single-threaded, and does not run multiple threads in parallel. A single-threaded client 201 may be, for example, a browser that is configured to execute JavaScript asynchronously, but with a single thread. In these and other embodiments where the client (or server as described in more detail below) may be single-threaded, each processing task in the set of processing tasks is run on the same single processing thread. The single processing thread interleaves the steps executed for each processing task. That is, the processing thread may perform some steps for a first task (e.g., requesting a first subset of search results), and while the thread is waiting for the first task to complete a step, begin performing some steps for a second task (e.g., retrieving a second subset of search results). In this way, the set of processing tasks may be executed asynchronously, analogous to a set of multiple processing threads.

In some embodiments where the client 201 is single-threaded, the client 201 may determine how many tasks are needed by assigning a first task and submitting an initial request to the database in a manner similar to the process described above in reference to steps 404-410. As described above, when the client has received a response to the initial request, the client may then determine the total number of search results, and the number of requests to the database. The client 201 may then assign a task to retrieve each subset of search results from the database 203. Because the initial request also retrieves a first subset of search results, the client 201 may also filter, sort or rearrange search results 511 as described in more detail below. The client 201 may assign tasks to subsets of search results in an order determined by a queue as described above. Subsets of search results that have been assigned a task are executed in step 504 by submitting a request to the database in step 505, and receiving a response from the database comprising the assigned subset of search results in step 506. In some embodiments of the invention, the client 201 may send requests to multiple servers and/or databases located at different locations or domains.

Similarly, in some embodiments of the invention, the server 202 may be single-threaded. In some embodiments where the server 202 is single-threaded, the processing tasks are run on the same single processing thread, and perform steps to retrieve a subset of search results. The single processing thread interleaves the steps executed for each processing task, allowing the set of processing tasks to be executed asynchronously, analogous to a set of multiple processing threads.

In one aspect of the invention, the response messages received at the client 201 may include rank information for each search result. For example, a subset of search results may be the first ten titles of publications responsive to a user's query. Each publication may also be associated with the rank accorded by the search engine 214, indicating the relevance of the search result to the query. For example, the rank order may be a separate data field, or it may be the order in which the search results are returned. The client 201 may then use the rank information to display the search results to the user in a manner that visually conveys the relative importance of the search results. In other aspects of the invention, the client 201 may filter, sort, or rearrange the search results after they have been received. As described above, the search results and metadata received from the database 203 or server 202 may be stored as parsed search results in a local memory system 206. In step 511, the client 201 may then filter, sort, or rearrange the search results according to different criteria. For example, although the search results may be received from the server 202 or database 203 ordered by their relevance, the client 201 may sort the search results by title, author, organization, year, journal, keyword, or date. The client 201 may then display the search results as shown in step 512 in a manner that visually conveys the new order based on the filtering, sorting, or rearranging of the search results.

Figure 6A:
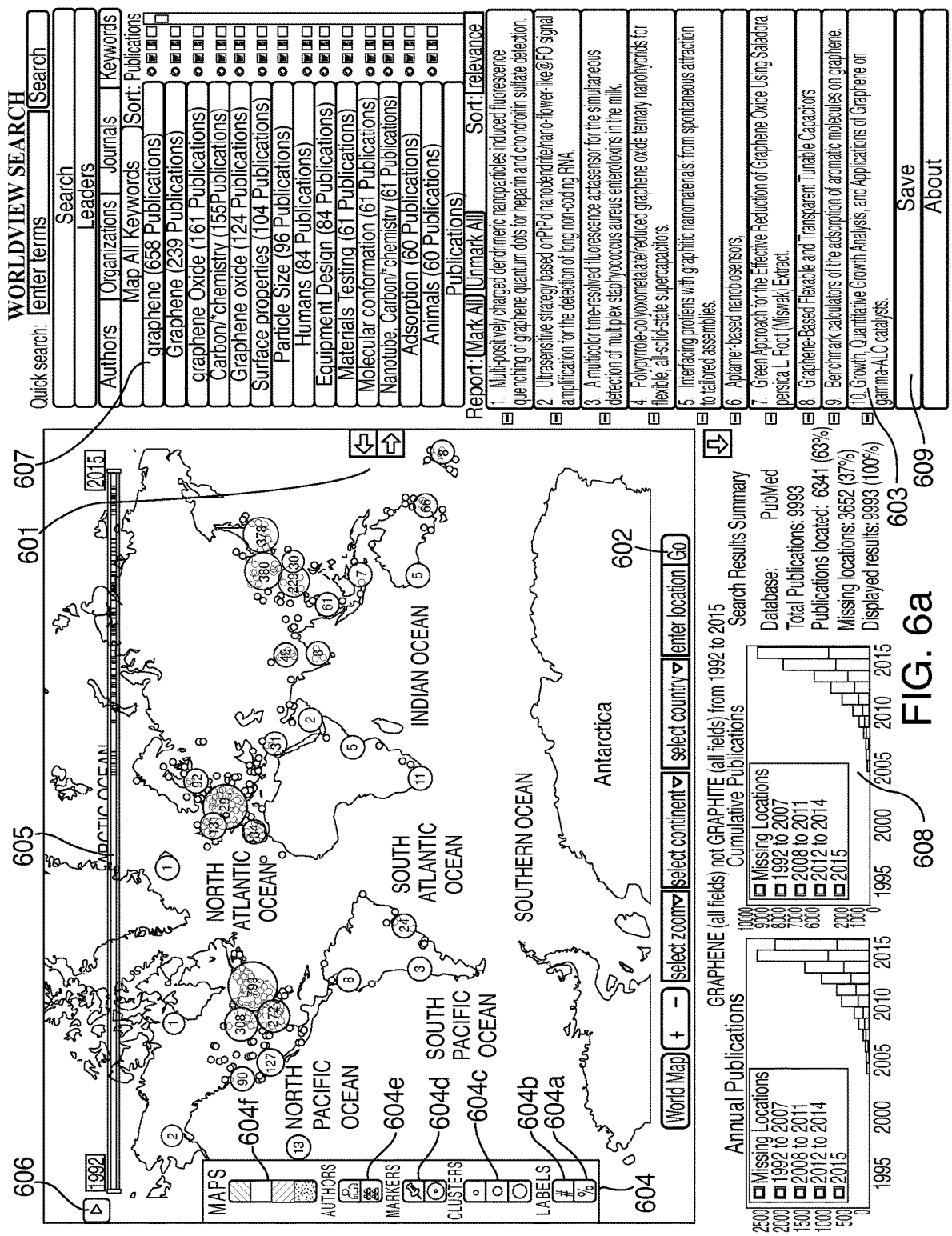
Figure 6B:
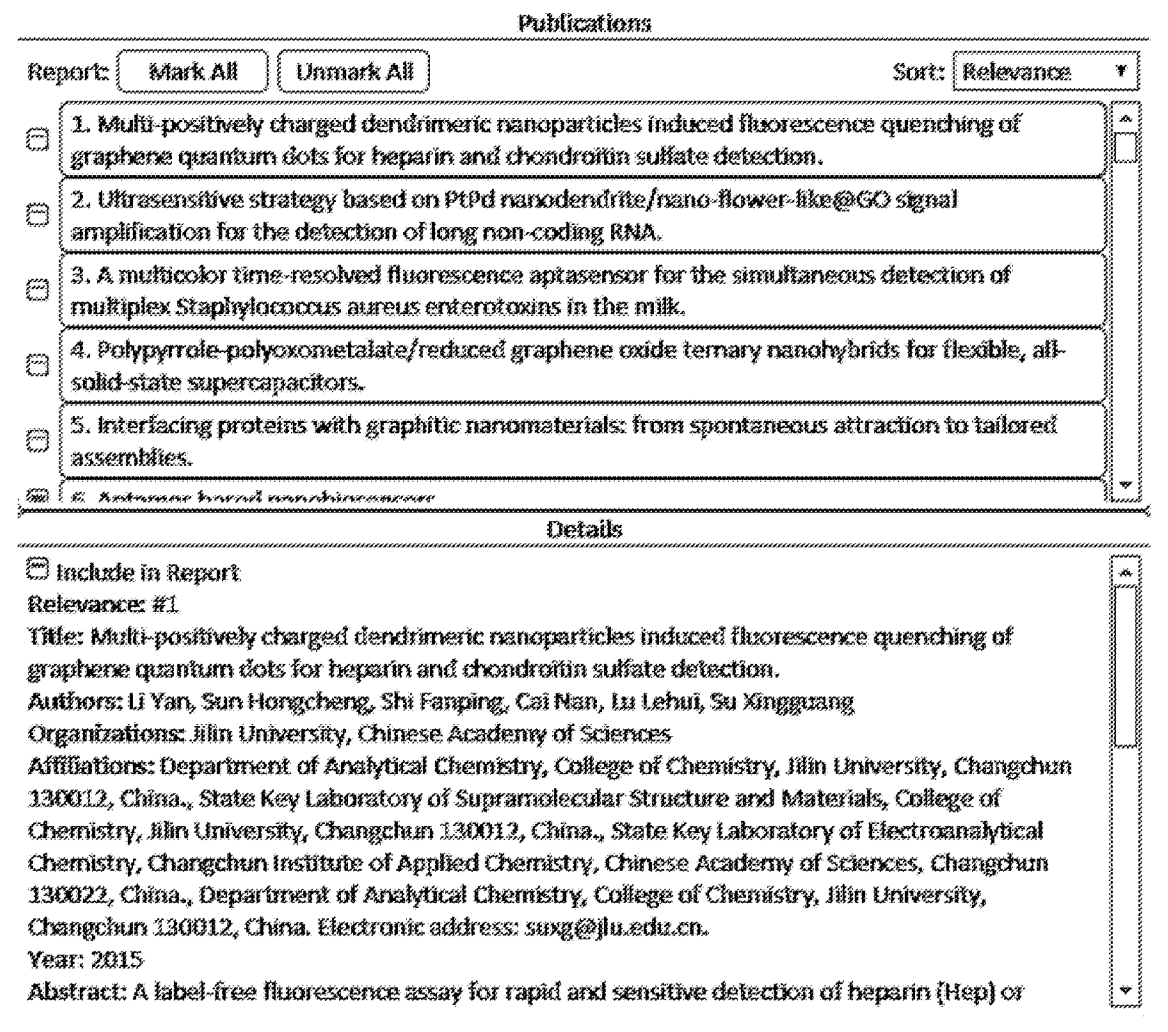
Figure 6C:
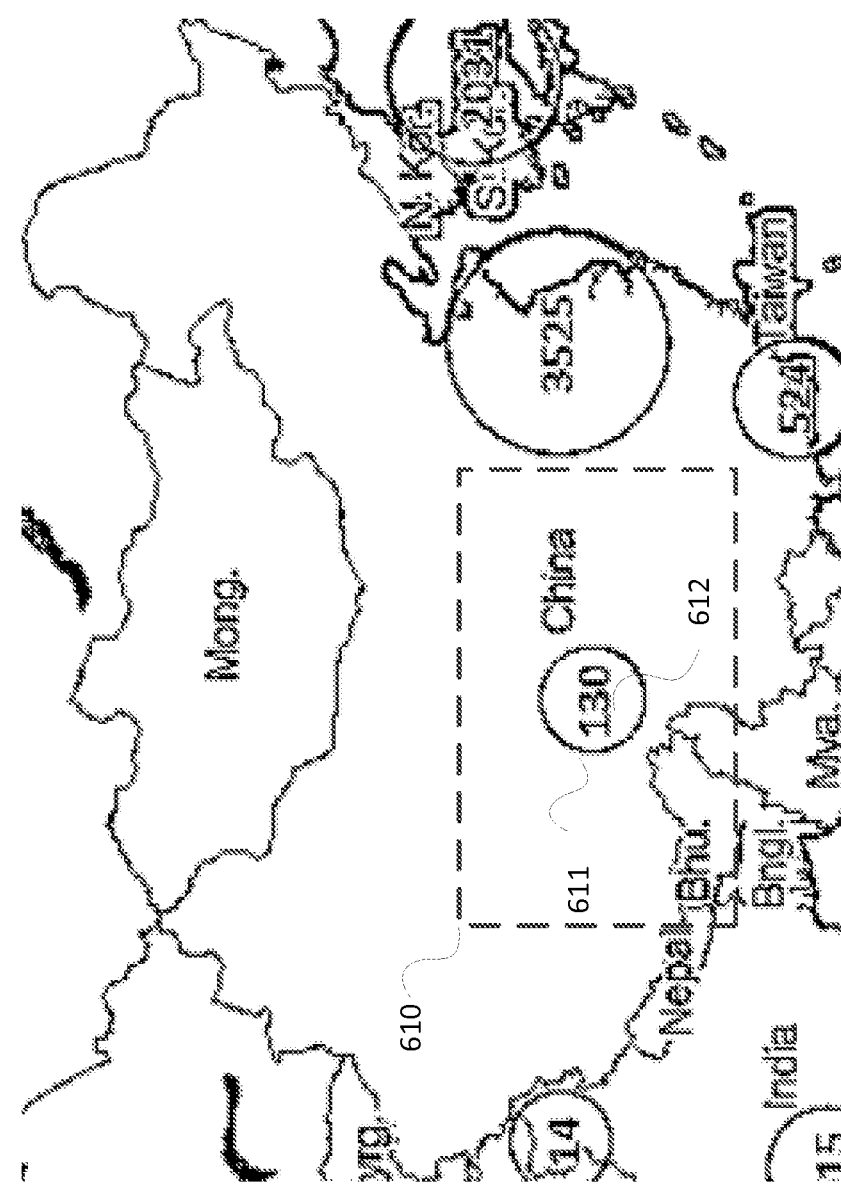

FIG. 6a shows a client interface for displaying and exploring search results with user input according to some embodiments of the invention. The interface may include an interactive map 601, map navigation controls 602, a virtual scrolling search result list 603, map controls 604, a time slider 605, a time lapse control 606, virtual scrolling dynamic leader lists 607, one or more charts 608, and a save control 609. The interface shown in FIG. 6a enables a user to appreciate various characteristics of the search results as a whole. For example, users may simultaneously view geospatial and geotemporal relationships between search results in a single webpage without re-querying or repeatedly accessing a database, or performing multiple searches. Further, as described in more detail below, the interface allows a user to access, filter, sort, visualize and save search results.

Interactive map 601 displays search results and metadata associated with search results as icons and symbols overlaid onto a map. The map 601 is interactive in that a user may select or manipulate map navigation controls 602 to change how or what portion of the map the user may view. The map navigation controls 602 may be for example controls that zoom or pan the map to a specific geographic region. Map navigation controls 602 may further include drop down lists of continents, countries, or predefined regions of interest to the user, or a search box where the user may enter a region by name. When a user selects a continent, country, or region, the map may be redrawn with the user's selection as the center of the map.

Virtual scrolling list 603 displays search results that are responsive to the user's query or that match a user's changed search criteria, such as filtered or sorted search results. Instead of displaying the partitioned search results as separate pages that a user must browse through, the virtual scrolling list 603 allows the user to scroll through the entire set of search results retrieved from the database with a scroll bar. In some embodiments, the virtual scrolling list may only load the subset of search results that need to be actively displayed based on the position of the scroll bar, the size of the window and the size of each display element. This allows very large numbers of search results to be displayed while saving processing power and memory. In other embodiments, each search result may be displayed by its rank and its search result value. The search result value may be for example the title of a publication. The search result value may be interactive such that when a user selects it, the interface displays the metadata related to the publication. For example, when a user selects the first search result, the interface may open a new pane as shown in FIG. 6b, which shows metadata related to the first search result, such as the publication's authors, organizations, year of publication and abstract. A selection box may be provided next to each search result so that a user may mark the publication for inclusion in a report as described below.

In one aspect of the invention, the virtual scrolling list 603 is populated independently of the server 202 connecting to the database 203. For example, as described above, the client 201 may store the search results it receives from the server 202, enabling the client 201 to further process the results without connecting to the server 202 or database 203. The virtual scrolling list 603 may then be populated using the search results stored in the client's local memory system. In this way, when a user filters, sorts, or rearranges the search results according to changed criteria, the virtual scrolling list may update its display.

Map control panel 604 is a panel of control buttons and icons that assist in controlling the various markers and symbols overlaid onto the map. The scalable map background shown in FIG. 6a underneath the search result markers and symbols comprises several map tiles. Map tile buttons 604f allow users to summon alternative sets of map tiles for the scalable map background. Author buttons 604e allow a user to manage how the map displays author information associated with a publication. They may display single or multiple authors per search result, respectively. For example, the author button 604e may allow a user to show one author's location per publication, or to show multiple authors' locations per publication. Marker buttons 604d allow users to select a pin map where a pin color encodes year of publication, or a heat map in which color represents the density of search results in a given geographic area. In this way, the invention indicates the properties of publications in a certain region with color coded pins or heat maps. The color of the pins may indicate the time period of publication and the colors of the heat maps may correlate to the geographic density of publications.

Cluster buttons 604c allow the user to set the distance over which results are clustered. An exploded view of an exemplary cluster 610 according to one embodiment of the invention is shown overlaying a central region in China in FIG. 6c. Cluster 610 may be may be represented by a shape 611, such as for example a circle. Clusters may also include a calculation 612 representing the amount of search results displayed within the shape 611. In some embodiments of the invention, the user may select or click on the cluster, which as described in more detail below causes the publications within the cluster shape to be displayed in the virtual scrolling list 603, and updates the contents of the dynamic leader list 607 and chart 608. For example, the cluster may be a hyperlink, that when selected, updates the virtual scrolling list to display only those publications within the cluster, updates the leader list to display only leaders with that cluster and updates the charts to display only publication statistics within that cluster. Calculation buttons 604a and 604b set the type of calculation that is displayed within the cluster shape. A calculation may be, for example, the raw number of publications, shown as 604b, or the percentage of all publications found in the cluster, shown as 604a. In some embodiments, the user may turn off or disable the display of the markers, icons, and symbols controlled by the groups of buttons. For example, the user may use the buttons from groups 604d, 604c, 604b and 604a to turn off their associated markers and symbols. However, in a preferred embodiment, at least one button from the group of buttons in 604f and 604e is selected at all times.

Time slider 605 is a control that allows the user to change the date range of search results being displayed. The time slider 605 may include a marker for a start range and a marker for an end range. The user may adjust the position of these markers on the time slider. The date corresponding to the position of the marker may be shown above the time slider. The position of the start and end date markers may specify a date range for filtering search results. Thus, when the user adjusts the position of the start and end date markers, the client may filter search results according to the new date range, which the map, charts, search results list and dynamic leader lists may display. When the pin map is selected in 604d, the timeline may be colored to reflect the years that are represented by the various colors of the pins. In one aspect of the invention, the filtering and display of the search results may occur independently of a connection to a database or server, without submitting any other requests to the server or database.

The characteristics of the search results may be further conveyed to the user with charts 608. For example, charts 608 may be bar charts that show the annual number of publications published each year, or as a cumulative number of publications published. When the pin map is selected in 604d, the bars of the charts may be colored to reflect the years that are represented by the various colors of the pins. The bar chart depicting numbers of search results may contain a second set of bars depicting the number of search results without attributable locations.

Time lapse 606 is a control that invokes a time lapse animation of the search results. As discussed above, each search result may be associated with date metadata such as publication year. When time lapse 606 is selected, the end range marker may be automatically aligned with the start range marker, and then the end range marker may be incrementally advanced in time. The interactive map, charts, dynamic leader lists and search results list may then display the search results for the time span between the markers as it progresses chronically to the end range date. Thus, for example, if the search results include publications and their publication dates, the time lapse may incrementally show which publications were published in the start range date, and then sequentially add each year until the end range date is reached. As the time lapse progresses through each year, the interactive map icons and symbols that represent the search results, and the charts, the dynamic leader lists and the search results list are updated chronologically, providing an animated visualization of the temporal characteristics of the search results. The start and end dates of the time lapse animation can be configured by the start and end date markers on the time slider 605. Time lapse 606 may include a pause control for allowing a user to pause the animation.

Dynamic leader list 607 displays dynamic leader lists to the user. Dynamic leader lists are ordered tabulations of data and metadata associated with search results, and are generated using the processes described below in reference to FIGS. 7a and 7b. A dynamic leader may be metadata-based filters by which the search results may be further measured and/or refined. A dynamic leader list may comprise, for example, different types of categories, such as keywords, authors, organizations, or journals. Each leader may be displayed as a dynamic list in table 607 with its value and its frequency. For example, FIG. 6a shows a dynamic leader list for the keyword category. The list shows each keyword and the number of times it occurs in the search results. In some embodiments of the invention, each dynamic leader list is interactive and may be selected by a user. When a user selects a dynamic leader list, the search results may be filtered and the map, charts and search result lists may be redrawn as described in more detail below. Thus, dynamic leader lists allow users to interactively refine search results using combinations of semantic, geographic and temporal filters.

Figure 7A:
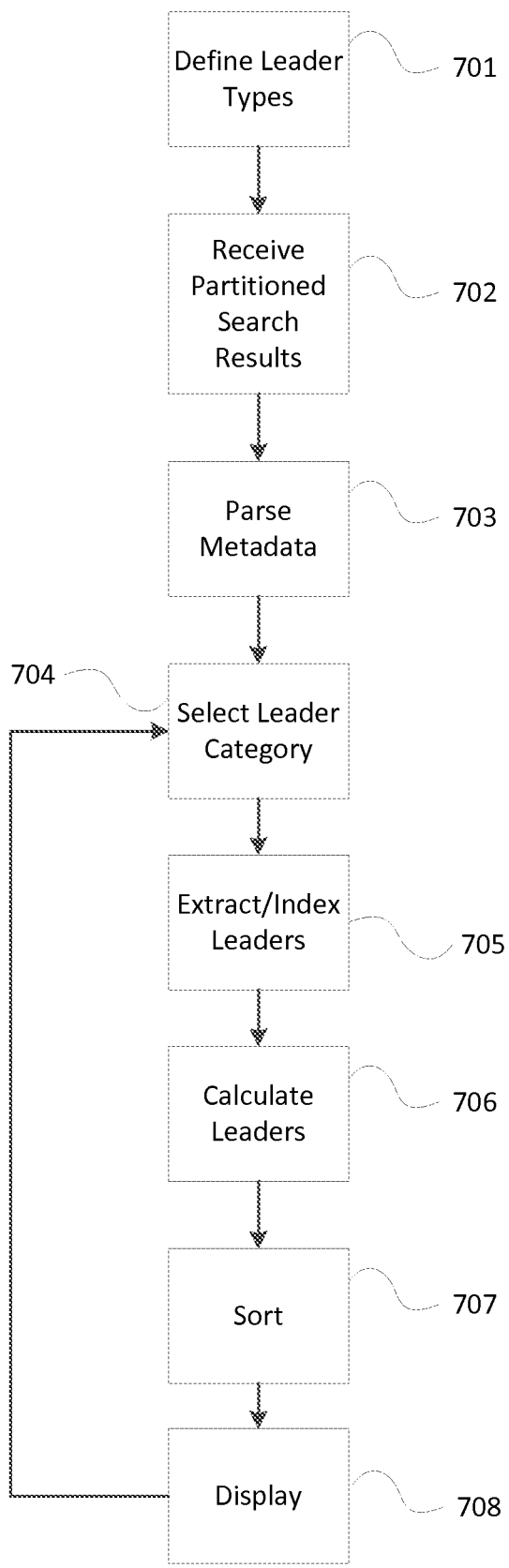
FIGS. 7*a* and 7*b* illustrate methods for calculating and displaying leader lists according to embodiments of the invention.

FIG. 7a shows a method for displaying dynamic leader lists according to some embodiments of the invention. Dynamic leaders may be metadata-based filters by which the search results may be further measured and/or refined. For example, dynamic leader lists may be categorical, ordinal, geographic or temporal. In embodiments where the dynamic leader list is a category, the categories may include keywords, authors, organizations, and journals. Keywords may be author-provided terms indicating topics of relevance to the author's publication. Thus, retrieved search results may be further measured and refined by determining, for example, how often certain keywords appear in the metadata of the search results. In step 701, the categories may be specified by a user or administrator. Dynamic leader lists are created by receiving a set of search results as shown in step 702, and then parsing the metadata associated with the search results as shown in step 703. The parsed metadata may be indexed by sorting and associating the parsed metadata with the search results. Because the search results may be stored locally at the client, the users may sort, filter, and redisplay search results and metadata independently of a server or database. Thus, a user may sort, filter, and redisplay search results when the client is offline or has otherwise no connection to a database or client. After parsing the metadata in step 703, the client 201 may execute the following steps for a particular leader type that is selected by the user. According to some embodiments of the invention, leader categories are not generated until they are selected by the user. If the user interface is being loaded for the first time, a default leader category may be selected. A user may then select a new leader category as shown in step 704. Leaders may then be extracted and indexed based on the selected leader category as shown in step 705.

In step 706, the client may calculate the number of occurrences of each dynamic leader. For example, if the dynamic leader type is a keyword category, the client 201 may calculate the frequency with which each keyword appears in the search results. The dynamic leaders may then be sorted either by name or by total number of occurrences as shown in step 707. The dynamic leaders may then be displayed on the dynamic leader list 603 of the interface, as shown in step 708. The value of the dynamic leader may be displayed with the number of occurrences throughout the search results. Thus, for example, the dynamic leader list may convey which author appears most frequently in the search results.

Figure 7B:
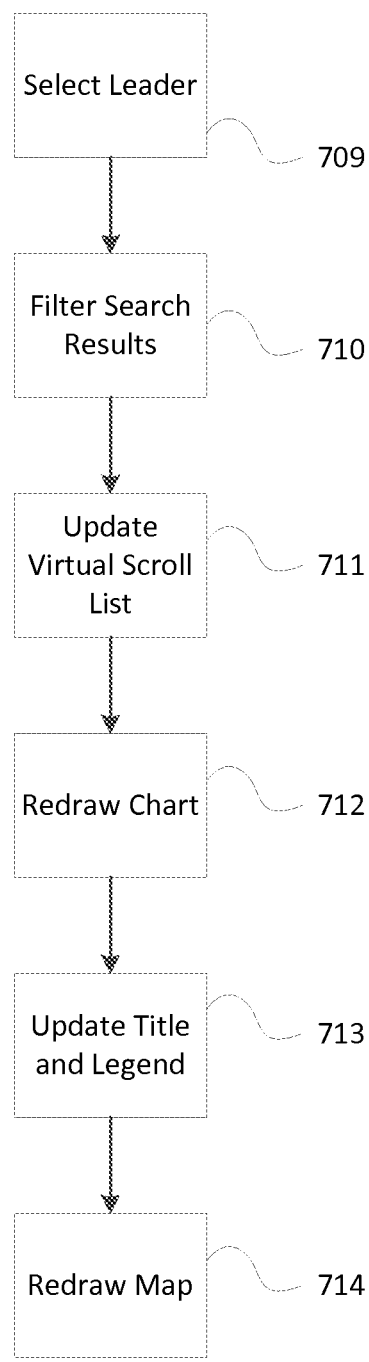

FIG. 7b shows a process for updating the interface when a user selects a dynamic leader. A user may select a dynamic leader as shown in step 709. The client may filter the search results that contain the selected dynamic leader as shown in step 710. For example, if the user selected a particular keyword, then the client filters the search results that contain the selected keyword. The client may then update the virtual scrolling search result list 603 to display only those search results that match the selected dynamic leader. The client may further redraw charts 712, update the map's title and/or search result summary 713, and/or redraw the map 714, with the search results that match the selected dynamic leader.

In one aspect of the invention, the dynamic leader lists may be updated according to metadata such as geospatial or geotemporal filtering using the map clusters 610, clusters controls 604c, and temporal controls 605 and 606. For example, the user may select one or more geographic locations on the hyperlinked cluster map by selecting appropriate clusters 610. In response, the dynamic leader list 607 and search results list and charts may be filtered to show only those search results associated with the selected geographic location. In this way, a user may identify local leaders dynamically within a search term category. For example, a user may construct a query for journal articles that contain the search term "graphene." After retrieving the set of search results, the client 201 may calculate the dynamic leaders by the keyword category. The client 201 may then tabulate the number of occurrences that each keyword appears in the entire set of search result. These dynamic leaders may then be sorted and displayed in dynamic leader list 607. Sorting and displaying the dynamic leader list may convey to the user which keywords appear most frequently in the set of search results. For example, if the keyword "electrode" appeared at the top of the dynamic leader list 607, this would convey to the user that it is the most frequently used keyword in the set of search results. When a user selects the "electrode" dynamic leader, the client updates the interface by filtering the search results, and redrawing the map, charts, titles and publication lists to reflect data that contains the term "graphene" in any field plus the term "electrode" in the keyword field. The selection of a single cluster 610 or multiple clusters on the map further filters the search results, and redraws the map, charts, titles and publication lists to reflect the data that contains the geospatial constraint.

Similarly, a user may narrow the search results to a selected date range with time slider 605. The updated dynamic leader list may thereby identify leaders within specific time periods. Using the example above, altering the time slider 605 constrains the search results further, and causes the client 201 to redraw the map, charts, titles and publication lists to reflect the additional temporal requirement. In this way, a user may apply semantic, geographic and temporal filters in various different combinations to obtain highly refined slices of search results.

Save control 609 enables a user to generate a report based on the received search results. As explained above, the virtual scrolling list 603 allows a user to mark certain search results for inclusion in a saved report. The save control 609 allows a user to generate a report that includes those search results marked for inclusion. The save control 609 may provide delivery options to customize the search report. For example, the save control may allow a user to add an image of the map 601 with icons and symbols, charts 608, search result data and metadata, and/or a time lapse animation. The save control 609 further provides input fields for a user to choose a filename and file type (e.g., an MS Word document or MS PowerPoint document or RIS bibliographic file for the report). The save control may also allow all of the data and metadata from a specific search to be stored in a file and later restored to the client interface for additional analysis.

Variations, modifications, and other implementations of what is described herein may occur to those of ordinary skill in the art without departing from the spirit and scope of the present invention and its claims.

What is claimed is:

1. A method for improving the delivery of partitionable search results from a search engine comprising:

receiving from a client at least one natural language query input by a user for searching a database with a search engine that provides a plurality of partitions of a set of search results responsive to the at least one natural language query, wherein the set of search results contain all search results from the database that are responsive to the at least one natural language query and wherein the form of the database is abstracted such that the search engine is capable of searching partitioned and unpartitioned databases;

partitioning the set of search results into the plurality of partitions of the set of search results after the at least one natural language query is received;

executing a set of processing tasks in parallel with other processing tasks wherein each processing task submits at least one request to the search engine and creates a response message for the client, the response message comprising an assigned subset of search results and metadata related to each of the search results in the assigned subset, wherein the response message repackages the assigned subset of search results and metadata by excluding unused and irrelevant information; and sending the response message to the client, wherein the set of processing tasks execute asynchronously with respect to each other, causing a server to receive the assigned subsets of search results in different amounts of time and concurrently with respect to each other, wherein the response message is sent to the client upon being created such that when a first assigned subset of search results takes longer to retrieve from the search engine than a second assigned subset of search results, a response message containing the second assigned subset of search results can be created and sent to the client before the first assigned subset of search results is received at the server, wherein the set of processing tasks continuously send a plurality of response messages to the client, wherein the client begins displaying each response message of the plurality of response messages once they are received by the client and before the server has finished sending response messages, and wherein all search results are received without loading an additional page or initiating a page refresh.

2. The method of claim 1, further comprising retrieving information related to the assigned subset of search results from a second database, wherein the second database is configured to provide geo-temporal or geo-spatial information.

3. The method of claim 1, further comprising opening a connection at the server, and wherein the search request is received from a client over the connection, and the connection uses a streaming protocol selected from the group consisting of a WebSocket protocol, a Comet protocol, a TCP protocol and a UDP protocol.

4. The method of claim 3, wherein the connection is implemented with at least one XMLHttpRequest configured to execute asynchronously.

5. The method of claim 1, wherein the database is a remote database accessible by a second server.

6. The method of claim 5, wherein the second server is a request-response server.

7. The method of claim 6, wherein the request-response server is an HTTP server or an application server.

8. The method of claim 1, wherein the database is a local database stored on the server.

9. The method of claim 1, wherein the natural language query comprises a search term, a geographic location, or a date range.

10. The method of claim 9, wherein the inputting of the natural language query at the client comprises receiving user input from search fields of the client.

11. The method of claim 1, further comprising receiving a user selection corresponding to a time range, geographic location or search result attribute, and filtering the search results based on the user selection wherein the time range, geographic location or search result attribute are based on data and metadata in the search results.

12. The method of claim 11, wherein the metadata for filtering the search results is categorical, ordinal, geographic or temporal metadata.

13. A system that improves the delivery of partitionable search results from a search engine comprising:
at least one processor;
a database;
a search engine comprising the at least one processor, the at least one processor being configured to provide a plurality of partitions of a set of search results responsive to the at least one natural language query, wherein the set of search results contain all search results from the database that are responsive to the at least one natural language query, and wherein the specific form of the database is abstracted such that the search engine is capable of searching partitioned and unpartitioned databases and enables a size to be determined of the set of search results;
a server comprising the at least one processor, the at least one processor being configured to:
receive from a client the least one natural language query input by a user for searching the database,
partition the set of search results into the plurality of partitions of the set of search results after the at least one natural language query is received from the client,
execute a set of processing tasks in parallel with other processing tasks, wherein each processing task:
submits at least one request to the search engine,
creates a response message for the client, the response message comprising an assigned subset of search results and metadata related to each of the search results in the assigned subset, wherein the response message repackages the assigned subset of search results and metadata by excluding unused and irrelevant information, and sending the response message to the client, wherein the set of processing tasks execute asynchronously with respect to each other, causing the server to receive the assigned subsets of search results in different amounts of time and concurrently with respect to each other, wherein the response message is sent to the client upon being created such that when a first assigned subset of search results takes longer to retrieve from the search engine than a second assigned subset of search results, a response message containing the second assigned subset of search results can be created and sent to the client before the first assigned subset of search results is received at the server, wherein the set of processing tasks continuously send a plurality of response messages to the client, wherein the client begins displaying each response message of the plurality of response messages once they are received by the client and before the server has finished sending response messages, and wherein all search results are received without loading an additional page or initiating a page refresh.

14. A non-transitory computer-readable storage medium having instructions stored thereon that are executed by one or more processors to perform operations comprising:
receiving from a client at least one natural language query input by a user for searching a database with a search engine that provides a plurality of partitions of a set of search results responsive to the at least one natural language query, wherein the set of search results contain all search results from the database that are responsive to the at least one natural language query and wherein the form of the database is abstracted such that the search engine is capable of searching partitioned and unpartitioned databases;

partitioning the set of search results into the plurality of partitions of the set of search results after the at least one natural language query is received;

executing a set of processing tasks in parallel with other processing tasks wherein each processing task submits at least one request to the search engine and creates a response message for the client, the response message comprising an assigned subset of search results and metadata related to each of the search results in the assigned subset, wherein the response message repackages the assigned subset of search results and metadata by excluding unused and irrelevant information; and sending the response message to the client, wherein the set of processing tasks execute asynchronously with respect to each other, causing a server to receive the assigned subsets of search results in different amounts of time and concurrently with respect to each other, wherein the response message is sent to the client upon being created such that when a first assigned subset of search results takes longer to retrieve from the search engine than a second assigned subset of search results, a response message containing the second assigned subset of search results can be created and sent to the client before the first assigned subset of search results is received at the server, wherein the set of processing tasks continuously send a plurality of response messages to the client, wherein the client begins displaying each response message of the plurality of response messages once they are received by the client and before the server has finished sending response messages, and wherein all search results are received without loading an additional page or initiating a page refresh.

* * * * *